United States Patent [19]
Lewis

[11] 4,364,068
[45] Dec. 14, 1982

[54] INK JET CONSTRUCTION AND METHOD OF CONSTRUCTION

[75] Inventor: Arthur M. Lewis, Redding Ridge, Conn.

[73] Assignee: Exxon Research & Engineering Company, Florham Park, N.J.

[21] Appl. No.: 229,993

[22] Filed: Jan. 30, 1981

[51] Int. Cl.³ G01D 15/18
[52] U.S. Cl. 346/140 R
[58] Field of Search 346/140 R, 75

[56] References Cited

U.S. PATENT DOCUMENTS

| | | | |
|---|---|---|---|
| 3,683,212 | 8/1972 | Zoltan | 310/8.3 |
| 3,946,398 | 3/1976 | Kyser | 346/140 R X |
| 3,988,745 | 10/1976 | Sultan | 346/140 R |
| 4,032,929 | 6/1977 | Fischbeck et al. | 346/140 R |
| 4,115,789 | 9/1978 | Fischbeck | 346/140 R |
| 4,306,243 | 12/1981 | Taub | 346/75 |

OTHER PUBLICATIONS

Ream, G. L., Nozzle Configuration for Satellite-Free Ink Jet Operation; IBM TDB, vol. 22, No. 6, Nov. 1979, pp. 2238-2239.

*Primary Examiner*—Joseph W. Hartary
*Attorney, Agent, or Firm*—Norman Norris

[57] ABSTRACT

A glass tube having a substantially planar wall with an orifice formed at one end of the tube which forms the chamber for an ink jet from which droplets of ink are ejected. A transducer is coupled to the substantially planar wall. The ratio of the modulus of elasticity of the tube and the modulus of elasticity of the transducer are substantially equal.

26 Claims, 15 Drawing Figures

INK JET CONSTRUCTION AND METHOD OF CONSTRUCTION

BACKGROUND OF THE INVENTION

This invention relates to ink jets of the type which emit droplets of ink, and more particularly, to impulse ink jets of the type which emit droplets of ink on demand.

Impulse or demand ink jets emit or eject droplets of ink from an orifice in response to the movement of a transducer associated with a chamber coupled to the orifice. The transducer may be of the piezoelectric type which upon energization contracts the volume of the chamber so as to emit a droplet of ink from the orifice. An ink jet of this type is disclosed in U.S. Pat. No. 3,683,212—Zoltan wherein the chamber is formed by a glass tube which is substantially surrounded by a cylindrical transducer. The orifice coupled to the chamber may be formed, at least in part, by the glass tube. As the cylindrical transducer contracts in response to energization, the volume of the chamber contracts and a droplet of ink is expelled from the orifice.

Impulse ink jets formed from glass tubes and cylindrical transducers are typically difficult to construct with reproducibility, i.e., achieving repeatable characteristics in different ink jets. Moreover, the cylindrical transducer is somewhat expensive and fair amounts of electrical energy are needed to energize the transducer so as to contract the volume of the glass tube sufficiently to produce a droplet. In addition, relatively large amounts of energy are dissipated by mechanical damping. Ink jets utilizing this cylindrical construction are also difficult to assemble. Moreover, ink jets of this type have a substantial number of significant resonances which complicate behavior of the jet. In addition, ink jets of this type are difficult to construct in a compact array.

Other impulse ink jet designs have been employed including composite structures in which a chamber coupled to an orifice is formed in part by a substantially planar diaphragm which is deflected inwardly into the chamber by a suitable transducer. Such impulse jet constructions are disclosed in U.S. Pat. Nos. 3,988,745—Zoltan, 4,115,789—Fischbeck and 4,032,929—Fischbeck et al. Although constructions of this type are desirable from a reproducibility and cost standpoint, as well as from energy considerations, such devices may create serious material compatibility problems. In this regard, it will be understood that a variety of materials may contact the ink and this may create ink and materials compatibility problems.

SUMMARY OF THE INVENTION

It is an object of this invention to provide an ink jet which minimizes materials compatibility problems.

It is another object of this invention to provide an ink jet which is easily constructed.

It is a related object of this invention to provide an ink jet which is reproducible or repeatable.

It is another related object of this invention to provide an ink jet which may be constructed at relatively low cost.

It is a further object of this invention to provide an ink jet wherein the resonance characteristics will not complicate behavior of the ink jet.

It is a further object of this invention to provide an ink jet which will minimize energy requirements.

It is a still further object of this invention to provide an ink jet which leads itself to the construction of an array.

In accordance with these and other objects of the invention, an ink jet comprises a glass tube having a substantially planar wall and chamber formed in part by the wall. A transducer is coupled to the wall for changing the volume of the chamber and an orifice is formed at the end of the tube for emitting droplets when the volume of the chamber is reduced in response to the state of the transducer.

In one preferred embodiment of the invention, the transducer is of the bender type. In another embodiment of the invention, the transducer may be of the expander type.

In the preferred embodiment of the invention, the maximum cross-sectional dimension of the chamber in a direction parallel with the wall is substantially greater than the maximum cross-sectional dimension of the chamber in a direction perpendicular to the wall. In a particularly preferred embodiment of the invention, the tube and thus the chamber is rectangular in cross-section. However, other configurations having a substantially planar wall may be utilized.

In accordance with another important aspect of the invention, the rectangular tube is tapered inwardly toward the orifice. In a particularly preferred embodiment of the invention, the orifice itself is integrally formed from the glass tube.

In accordance with another important aspect of the invention, the end of the glass tube opposite the orifice may be deformed so as to provide a restrictor. In addition, the glass tube may be formed for purposes of providing a coupling with an appropriate connector such as a tube or hose.

In accordance with still another important aspect of this invention, it is important that the planar wall of the glass tube have the proper deformation characteristics.

In accordance with yet another important aspect of the invention, a plurality of glass tubes each having a substantially planar wall and a plurality of transducers may be assembled so as to form an array. In this embodiment of the invention, it may be desirable to provide an orifice plate.

BRIEF DESCRIPTION OF THE DRAWINGS

FIG. 12 is a sectional view of a transducer of the type utilized in the embodiments of FIGS. 1-8, 10 and 11; and FIGS. 12*a-g* and 12*cc* are schematic views of a method which may be utilized in making an ink jet and an ink jet array in accordance with this invention.

DETAILED DESCRIPTION OF PREFERRED EMBODIMENTS

Figure 2:
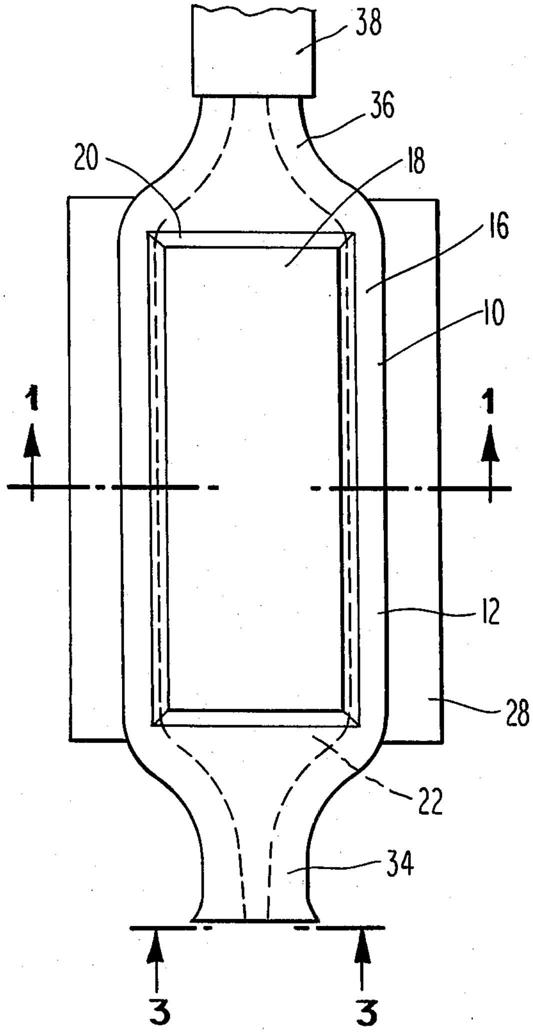
FIG. 2 is a plan view of the ink jet of FIG. 1.
Figure 1:
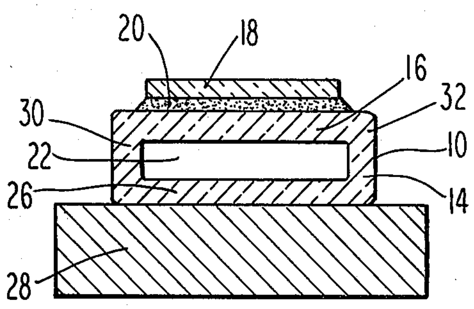
FIG. 1 is a sectional view of an ink jet constructed in accordance with the principles of this invention taken along line 1—1 of FIG. 2.
Figure 3:
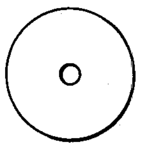
FIG. 3 is an end view of the ink jet of FIG. 2 taken along line 3—3 of FIG. 2.
Figure 4:
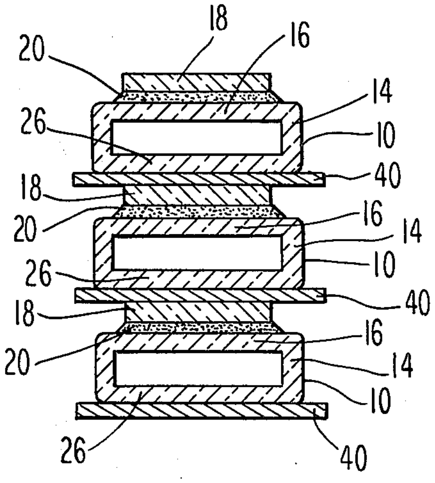
FIG. 4 is a sectional view of an array of ink jets of the type shown in FIGS. 1-3 taken along line 4—4 of FIG. 5.

Referring to FIGS. 1 through 3, an ink jet adapted to emit droplets is disclosed. The ink jet comprises a glass tube 10 having a portion 12 with a substantially elongated cross-section 14 of rectangular shape as best shown in FIG. 1.

The portion 12 of rectangular cross-section as shown in FIG. 1 is characterized, in accordance with this invention, as having a substantially planar wall 16 which is coupled to a bender or bimorph transducer 18 bonded to the wall 16 by a bonding or sealing layer 20.

Figure 1A:
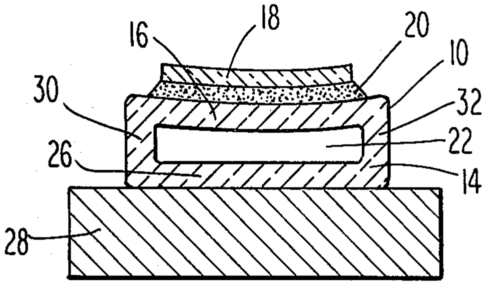
FIG. 1*a* is a sectional view comparable to the view of FIG. 1 with the transducer energerized and the chamber within the ink jet deformed.

It has been found that a substantially planar wall 16 may be deformed a sufficient amount as shown in FIG. 1*a* while minimizing the required electrical energy to drive the transducer 18 so as to contract an interior chamber 22 at the portion 12 so as to emit a droplet from an orifice 24 shown in FIG. 3. The planar nature of the wall 16 also dissipates a relatively small amount of energy in mechanical damping.

The portion 12 of tube 10, by virtue of its substantially rectangular cross-section, also includes an opposing substantially planar wall 26 as shown in FIG. 1. The planar wall 26 is secured to a base plate 28 or other relatively rigid support member. It will therefore be appreciated that whereas the wall 16 deforms as shown in FIG. 1*a* when the transducer 18 is energized, the wall 26 remains substantially undeformed.

As also shown in FIG. 1, end walls 30 and 32 connect the walls 16 and 26. However, the walls 30 and 32 are of substantially lesser height than the walls 16 and 26 are wide so as to maximize the percentage of contraction in the chamber 22 when the transducer 18 energized as shown in FIG. 1*a*. In this connection, it will be appreciated that a chamber of substantially square rather than rectangular cross-section would produce, for the same deformation of the transducer 18, a lesser percentage volumetric contraction. Furthermore, as will be shortly described with reference to FIGS. 4 through 7, the rectangular cross-section 14 as shown in FIGS. 1 and 1*a* is desirable so as to permit the stacking and packing of a plurality of glass tubes in forming a linear array.

As shown in FIG. 2, the orifice 24 is integrally formed from the tube 10 at a nozzle 34. This is particularly desirable since it minimizes materials compatibility problems, i.e., the entire jet is formed from the same material. The ink need only contact the glass of the tube 10. In the same regard, the tube 10 may be formed so as to provide a substantially cylindrical coupling portion 36 which may be connected to a suitable member such as a hose 38. It will also be noted that the coupling portion 36 serves as a restrictor so as to provide resistance to the backward flow of ink into the hose 38 when the transducer 18 is energized and the volume within the chamber 32 contracts.

Referring now to FIGS. 4 through 7, a plurality of tubes 10 of substantially rectangular cross-section 14 in a region 12 are stacked so as to form a linear array. Each portion 12 of the tubes 10 is coupled to a bender transducer 18 which is bonded to a substantially planar wall 16 by means of a bonding or sealing layer 20. The opposing planar wall 26 is secured to a relatively rigid support plate 40.

Figure 5:
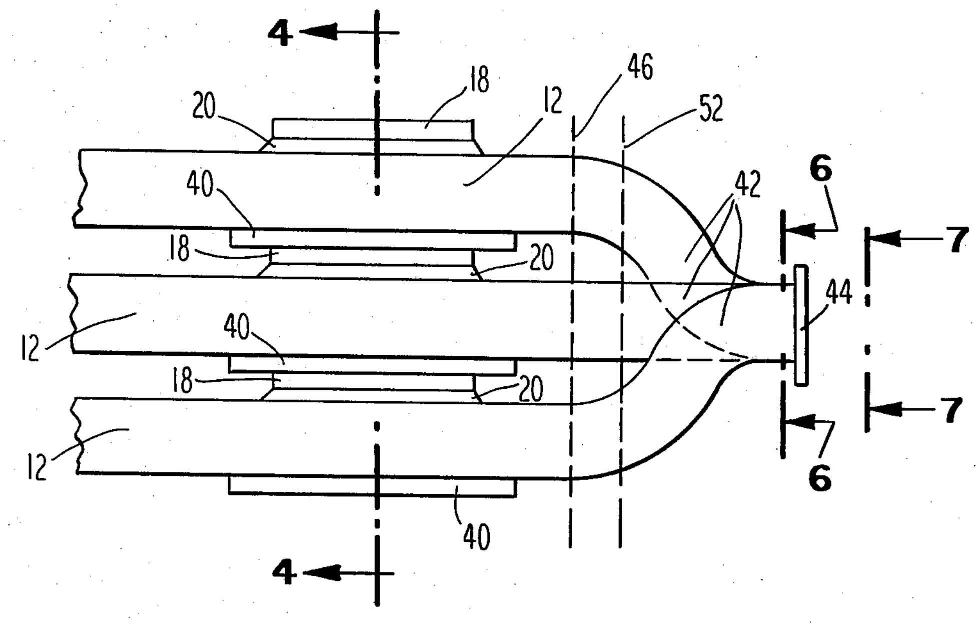
FIG. 5 is an elevational view of the ink jet array of FIG. 4.
Figure 6:
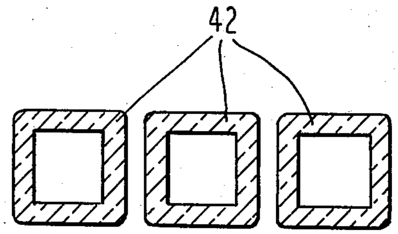
FIG. 6 is a sectional view taken along line 6—6 of FIG. 5.
Figure 7:
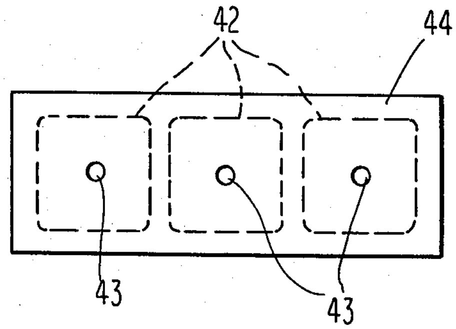
FIG. 7 is an end view of the array shown in FIG. 5 taken line 7—7.
Figure 7A:
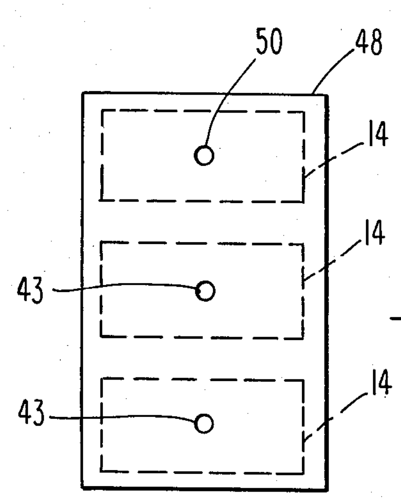
FIG. 7*a* is an end view of an alternative embodiment of the invention.

In accordance with this invention and the teachings of copending application Ser. No. 969,578, filed Dec. 14, 1978, now abandoned portions of the tube 10 are deformed and reduced in cross-sectional dimension as shown in FIG. 6 so as to permit the substantially linear alignment of tubular portions 42 as shown in FIG. 6. An orifice plate 44 having orifices 43 is then attached to portions 42 as shown in FIGS. 5 and 7. It will be appreciated that the relatively flat dimension of the rectangular cross-sectional tubes 10 allows for the compact stacking of the tubes 10 and the creation of a relatively compact linear array even though the transducers 18 of substantial area are utilized. It will also be appreciated that the orifice plate 44 may be placed closer to the transducers 18, and more particularly, at a line 46 shown in FIG. 5 by simply cutting the tubes 10 at that point. In that case, the orifice plate 48 will be substantially wider so as to block off the rectangular cross-section 14 as shown in FIG. 7*a*. If it is desirable to have orifices 50 somewhat more closely spaced in the plate 48, the more closely spaced orifices may be located, for example, along line 52 shown in FIG. 5.

From the foregoing, it will be appreciated that ink jets of the type shown in FIGS. 1 through 3 may be readily constructed into linear arrays as shown in FIGS. 4 through 7 and FIG. 7*a*.

Figure 8:
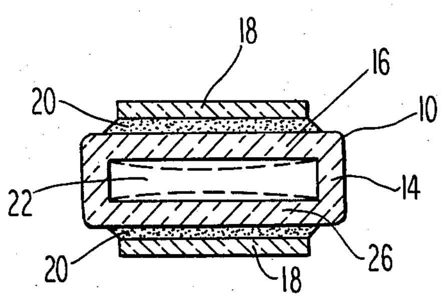
FIG. 8 is a sectional view of an ink jet of the type shown in FIG. 1 employing a pair of transducers.

Referring now to FIG. 8, a single tube 10 of rectangular cross-section 14 is shown. However, a pair of transducers 18 bonded to the tube 10 are juxtaposed to the substantially planar walls 16 and 26. The transducers 18 are sealed to the walls 16 and 26 by sealing or bonding layers 20. As shown by the dotted line within the chamber 22, contraction of the chamber from both sides by both transducers 18 assures that the chamber 22 is sufficiently contracted so as to emit the desired droplets.

Figure 9:
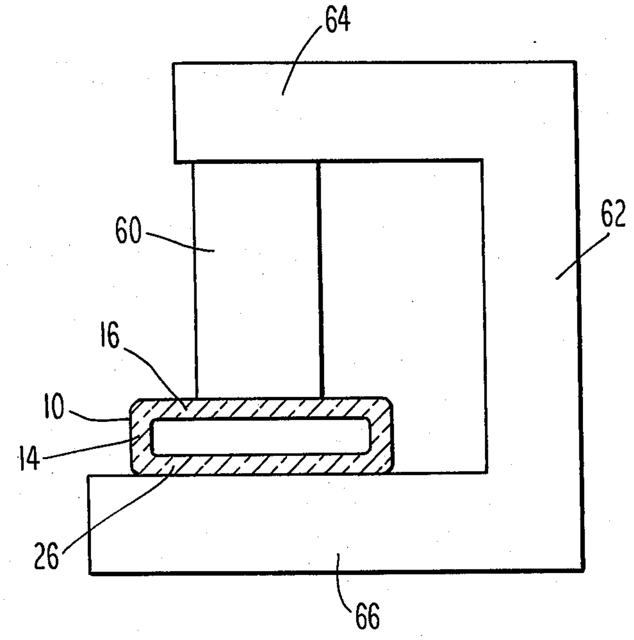
FIG. 9 is a sectional view of an ink jet employing an alternative transducer.

Referring now to FIG. 9, a glass tube 10 of rectangular cross-section 14 is shown in conjunction with a transducer 60 of the expander type which extends between the walls 16 of the tube 10 and a U-shaped support member 62 having an upper leg 64 in contact with the transducer 60 and a lower leg 66 in contact with and supporting the wall 26.

Figure 10:
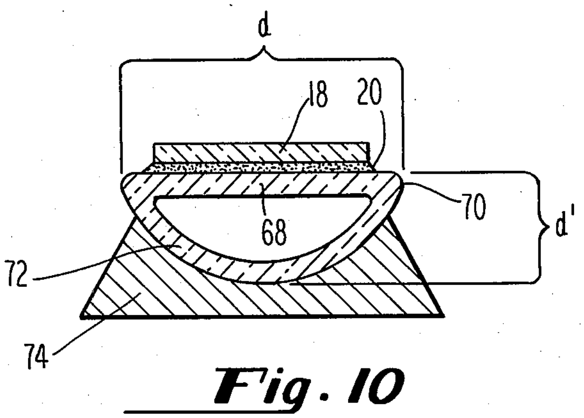
FIG. 10 is a sectional view of an ink jet of the type shown in FIG. 1 employing an alternative tubular configuration.
Figure 11:
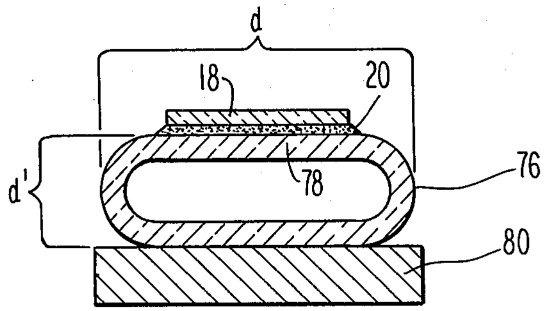
FIG. 11 is an ink jet of the type shown in FIG. 1 employing still another alternative tubular configuration.

Reference will now be made to FIGS. 10 and 11 wherein transducers 18 are coupled to a substantially planar wall extending in a directly generally parallel with maximum cross-sectional dimention. Furthermore, the wall has a dimension or width which is substantially greater than the maximum cross-sectional dimension or width of the tube in a direction perpendicular to the wall. More particularly, with respect to FIG. 10, the transducer 18 is sealed by a layer 20 to a wall 68 of a tube 70 having a cross-sectional configuration which is elongated and forms a flattened arc. The lower portion 72 of the tube 70 is substantially arcuate and supported by a base 74 of complementary arcuate configuration. It will be appreciated that the distance d corresponding to the wall 68 is substantially greater than the distance d′ perpendicular to the wall 68.

FIG. 11 shows another configuration wherein a tube 76 is substantially oval in configuration with one of the walls 78 sealed to the transducer 18 by a layer 20. The opposing wall of the tube 76 is supported by a base member 80. Here again the dimension d is substantially greater than the d'. It will be appreciated that the wall 78 may be curved and not therefore strictly planar. However, the wall 78 is sufficiently planar so as to fall within the definition of substantially planar as utilized herein.

Figures 12, 12C:
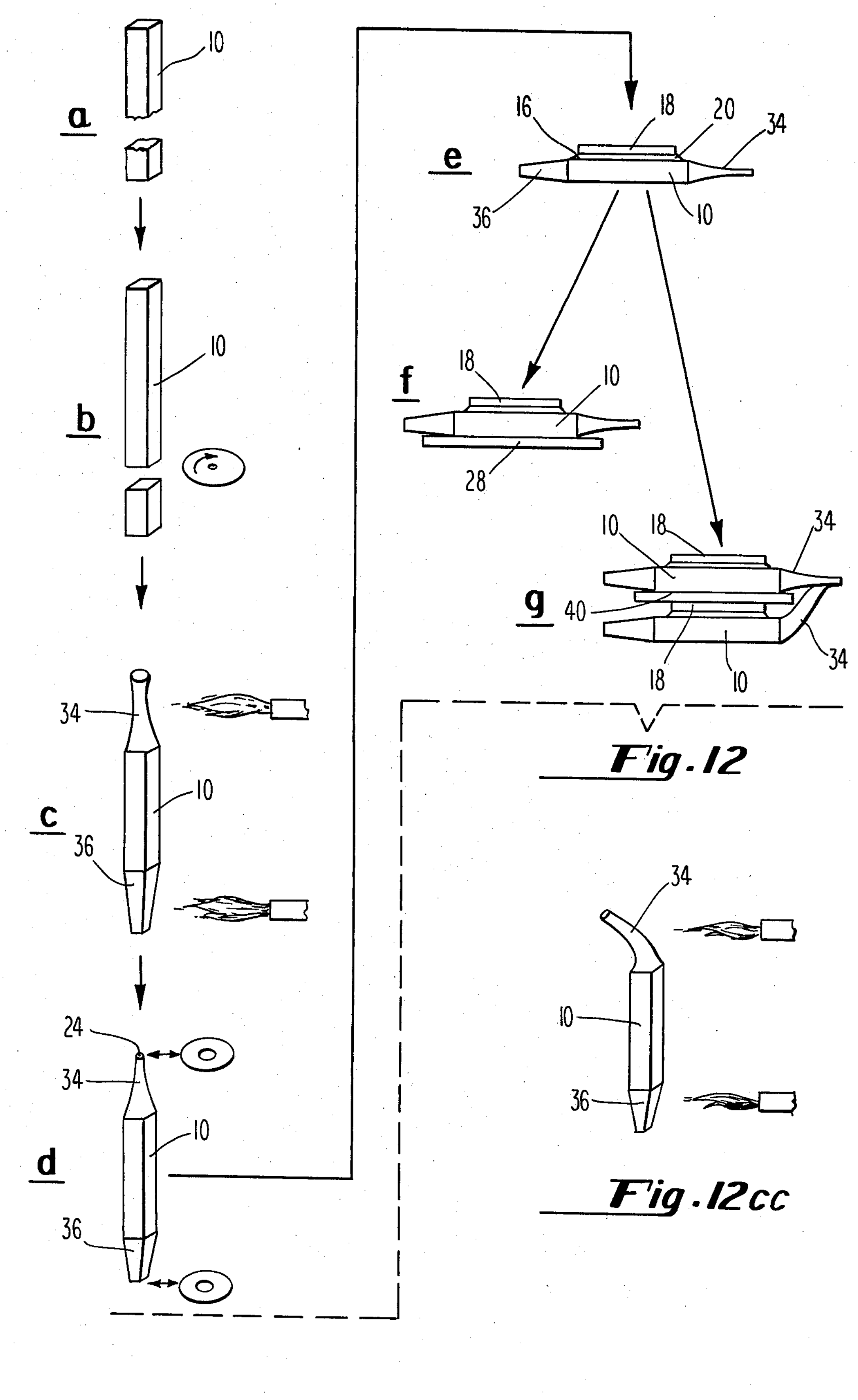

Reference will now be made to FIGS. 12(*a–g*) as well as 12*cc* for a discussion of the method by which the ink jets of FIGS. 1 through 11 may be made. Referring first to FIG. 12*a*, a glass tube of rectangular cross-section is depicted of indeterminate length. In FIG. 12*b*, the tube is severed by suitable cutting means, such as forming a tube of predetermined length.

In FIG. 12*c*, opposite ends of the tube 10 are heated. The end 34 is heated to reduce the cross-sectional area of the chamber within the tube 10 in preparation for forming an ink ejecting orifice. The opposite end 36 of the tube 10 is heated so as to provide a restrictor coupling at the back of the ink jet. In FIG. 12*d*, the ends 34 and 36 of the tube 10 are lapped so as to form an orifice 24 of predetermined size and a coupling at the end 36 of predetermined size.

Referring now to FIG. 12*e*, a transducer 18 is sealed by a bonding layer 20 to the tube 10 such that the transducer is applied to a substantially planar wall 16 of the tube 10. At the conclusion of the step shown in FIG. 12*e*, the tube 10 may be secured to a base 28 as shown in FIG. 12*f*. In the alternative, a plurality of tubes 10 formed by the process shown herein may be combined so as to form an array as shown in FIG. 12*g*. In order to bend one or more of the tubes 10 at the end 34, the heating step of FIG. 12*c* may also include the deformation of the tube 10 as shown in FIG. 12*cc* to create the shape shown in FIG. 12*g*. As also shown, in FIG. 12*g*, the member 40 is placed between one tube 10 and one transducer 18.

Reference has been made to glass tubes. As utilized herein, as expression "glass" is intended to embrace fused silica, common sodalime glass, borosilicate glass, fused quartz, fused silica and similar materials. Such materials have suitable elastic properties for the present invention and can be fabricated to the desired shapes suitable rectangular glass tubing for starting stock is commercially available.

The foregoing tube materials and configurations are desirable to assure that Young's modulus of elasticity for the tube is substantially equal to Young's modulus of elasticity for the transducer. For example, it is desirable to use a fused silica tube such that Young's modulus of elasticity for the tube is $7.3 \times 10^{10}$ Newtons/$m^2$ as compared with a transducer comprising Channel Industries 5550 having a Young's modulus of elasticity of $7.1 \times 10^{10}$ Newtons/$m^2$. As used herein, the modulus of elasticity is considered substantially equal if the smaller modulus is at least 50% and preferably at least 80% of the larger modulus.

In order to achieve efficacy in bending, it is desirable to utilize a tube having a thickness t which is equal to 1 to 20% and preferably 1 to 10% of the length of wall transverse to the axis of the tube, e.g. the length d of FIGS. 10 and 11.

Although a number of embodiments of the invention have been shown and described, it will be appreciated that other embodiments and modifications will occur to those of ordinary skill in the art as will fall within the true spirit and scope of the claims appended hereto.

What is claimed:

1. An ink jet adapted to project droplets of ink comprising:

a discrete glass tube having integrally formed walls of substantially uniform thickness, one of said walls being substantially planar and having a thickness of 1 to 20% of the length of said one of said walls transverse to the axis of the glass tube;

a transducer coupled to one of said walls of said tube, the modulus of elasticity for the tube being substantially equal to the modulus of elasticity for the transducer;

an orifice formed at the end of said tube for emitting droplets when said wall is moved in response to the state of said transducer.

2. The ink jet of claim 1 wherein said transducer bends.

3. The ink jet of claim 1 wherein said wall has a thickness less than the thickness of said tube.

4. The ink jet of claim 1 wherein the maximum cross-sectional dimension of the tube in a direction parallel with said wall is substantially greater than the maximum cross-sectional dimension of said tube in a direction perpendicular to the said wall.

5. The method of claim 4 wherein said tube is rectangular in cross-section.

6. The ink jet of claim 1 wherein said transducer is substantially planar and juxtaposed and parallel with said wall.

7. The ink jet of claim 1 wherein said glass tube includes a pair of substantially parallel walls forming said chamber and a pair of transducers coupled to said walls.

8. The ink jet of claim 7 wherein said glass tube is substantially rectangular in cross-section and said parallel walls are mutually opposing.

9. The facsimile apparatus of claim 1 wherein said orifice is integrally formed with said glass tube.

10. The facsimile apparatus of claim 1 wherein said transducer is of the bender type.

11. The facsimile apparatus of claim 1 wherein said transducer is of the expander type.

12. An ink jet array comprising:

a plurality of discrete glass tubes, each of said tubes having integrally formed walls of substantially uniform thickness, each of said tubes having a substantially planar wall and forming a chamber therein;

a plurality of transducers, one of said transducers being coupled to a wall extending in a direction generally parallel to the maximum cross-sectional dimension of said tubes;

an orifice formed at an end of each of said tubes for emitting droplets when each of said chambers is contracted;

each of said planar walls having a thickness of 1 to 20% of the length of said planar walls transverse to the axis of said tubes; and the modulus of elasticity for the tubes being substantially equal to the modulus of elasticity for the transducers.

13. The ink jet of claim 12 wherein said tubes have a substantially elongated cross-section.

14. The ink jet of claim 13 wherein said tubes are of substantially rectangular cross-section.

15. The ink jet of claim 13 wherein said tubes are stacked with said planar walls being substantially parallel.

16. The ink jet of claim 15 wherein said tubes are deformed so as to form a linear array of orifices.

17. A method of constructing an ink jet comprising the following steps:

providing a discrete, integrally formed glass tube having walls of substantially uniform thickness including a planar wall, said planar wall having a thickness of 1 to 20% of the length of said one of said walls transverse to the axis of the glass tube;

exposing a transducer to said planar wall of said tube, said transducer having a modulus of elasticity substantially equal to the modulus of elasticity of the planar wall; and creating an orifice at one end of said tube.

18. The method of claim 17 wherein said tube is substantially rectangular in cross-section.

19. The method of claim 17 wherein said tube is of substantially elongated cross-section and said wall extends in a direction generally parallel to the maximum cross-sectional dimension.

20. The method of claim 17 wherein said glass tube is cut to a predetermined length.

21. The method of claim 17 wherein said orifice is formed from one end of said tube.

22. The method of claim 21 wherein said orifice is formed by heating the tube at one end so as to reduce the cross-sectional dimension.

23. The method of claim 22 wherein said end is lapped after heating to form an orifice of predetermined size.

24. The method of claim 17 including repeating the steps with another glass tube and another transducer and forming an array from said transducers and said tubes.

25. The method of claim 24 including the steps of heating the ends of said tubes to reduce the cross-section of said tubes to form an orifice.

26. The method of claim 25 including the step of bending at least one of the tubes adjacent the orifice.

* * * * *